(12) United States Patent
Basavarajappa et al.

(10) Patent No.: US 10,528,407 B2
(45) Date of Patent: Jan. 7, 2020

(54) INTEGRATED STATISTICAL LOG DATA MINING FOR MEAN TIME AUTO-RESOLUTION

(71) Applicant: VMWARE, INC., Palo Alto, CA (US)

(72) Inventors: Chethana Hebbal Basavarajappa, Bangalore (IN); Amita Ranjan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 116 days.

(21) Appl. No.: 15/701,468

(22) Filed: Sep. 12, 2017

(65) Prior Publication Data

US 2019/0026174 A1    Jan. 24, 2019

(30) Foreign Application Priority Data

Jul. 20, 2017  (IN) .............................. 201741025752

(51) Int. Cl.
*G06F 11/07* (2006.01)
*G06F 9/455* (2018.01)
*G06F 17/30* (2006.01)

(52) U.S. Cl.
CPC ...... *G06F 11/0712* (2013.01); *G06F 11/0709* (2013.01); *G06F 11/079* (2013.01); *G06F 9/45558* (2013.01); *G06F 11/0766* (2013.01); *G06F 11/0778* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,120,685 | B2* | 10/2006 | Ullmann | G06F 11/0709 709/224 |
| 8,290,975 | B2* | 10/2012 | Gao | G06F 16/3322 707/767 |
| 8,595,568 | B2* | 11/2013 | Yoon | H04L 12/00 714/57 |
| 9,075,792 | B2* | 7/2015 | Dai | G06F 17/2755 |
| 10,013,655 | B1* | 7/2018 | Clark | G06F 16/382 |
| 10,120,748 | B2* | 11/2018 | Balakrishnan | G06F 11/0709 |

(Continued)

OTHER PUBLICATIONS

Amita Ranjan et al. Integrated Statistical log data mining for Mean time Auto-resolution.

*Primary Examiner* — Abu Zar Ghaffari
(74) *Attorney, Agent, or Firm* — Su IP Consulting

(57) ABSTRACT

A method may include generating, by a diagnosis manager, a plurality of pre-processed files based on a plurality of log files containing operational information related to one or more of the plurality of modules operating in the cloud environment. The method may include generating a set of weightage matrices based on a plurality of tokens extracted from the plurality of pre-processed files, and identifying a plurality of clusters based on the set of weightage matrices. The method may further include determining, by a resolution manager coupled with the diagnosis manager, an operational issue for a specific module selected from the plurality of modules and associated with a specific cluster selected from the plurality of clusters, based on the subset of tokens associated with the specific cluster; and performing a predefined action on the specific module based on the operational issue.

19 Claims, 5 Drawing Sheets

(56) References Cited

U.S. PATENT DOCUMENTS

| | | | |
|---|---|---|---|
| 2005/0160318 A1* | 7/2005 | Di Luoffo | G06F 11/0709 |
| | | | 714/25 |
| 2010/0211569 A1* | 8/2010 | Erhart | G06F 16/3322 |
| | | | 707/737 |
| 2012/0017112 A1* | 1/2012 | Broda | G06F 9/5083 |
| | | | 714/4.4 |
| 2014/0006844 A1* | 1/2014 | Alderman | G06F 11/0793 |
| | | | 714/4.1 |
| 2014/0025995 A1* | 1/2014 | Narayanan | G06F 11/0706 |
| | | | 714/37 |
| 2014/0188609 A1* | 7/2014 | Qiu | G06Q 30/02 |
| | | | 705/14.54 |
| 2015/0142808 A1* | 5/2015 | Ren | G06K 9/6223 |
| | | | 707/737 |
| 2015/0310115 A1* | 10/2015 | Ryger | G06F 16/93 |
| | | | 707/708 |
| 2016/0048756 A1* | 2/2016 | Hall | G06F 16/2425 |
| | | | 706/20 |
| 2017/0169078 A1* | 6/2017 | Fradkin | G06F 16/2465 |
| 2018/0089303 A1* | 3/2018 | Miller | G06F 16/26 |

\* cited by examiner

INTEGRATED STATISTICAL LOG DATA MINING FOR MEAN TIME AUTO-RESOLUTION

RELATED APPLICATIONS

Benefit is claimed under 35 U.S.C. 119(a)-(d) to Foreign Application Serial No. 201741025752 filed in India entitled "INTEGRATED STATISTICAL LOG DATA MINING FOR MEAN TIME AUTO-RESOLUTION", on Jul. 20, 2017, by VMware, Inc., which is herein incorporated in its entirety by reference for all purposes

BACKGROUND

In a cloud computing environment, applications and systems are becoming more and more complex, as many of the components in these applications and systems are delivered as cloud-based services such as database-as-a-service, search-as-a-service, etc. For example, a simple web-based application may easily include more than 10 services and components (including web-tier, application-server-as-service, database-as-service, and query-as-service), that may be designed and supported by different development teams. Thus, identifying problems and diagnosing potential root causes of these problems in such an environment may become a challenging task for developer and IT team due to growing complexity of this environment.

DETAILED DESCRIPTION

Figure 1:
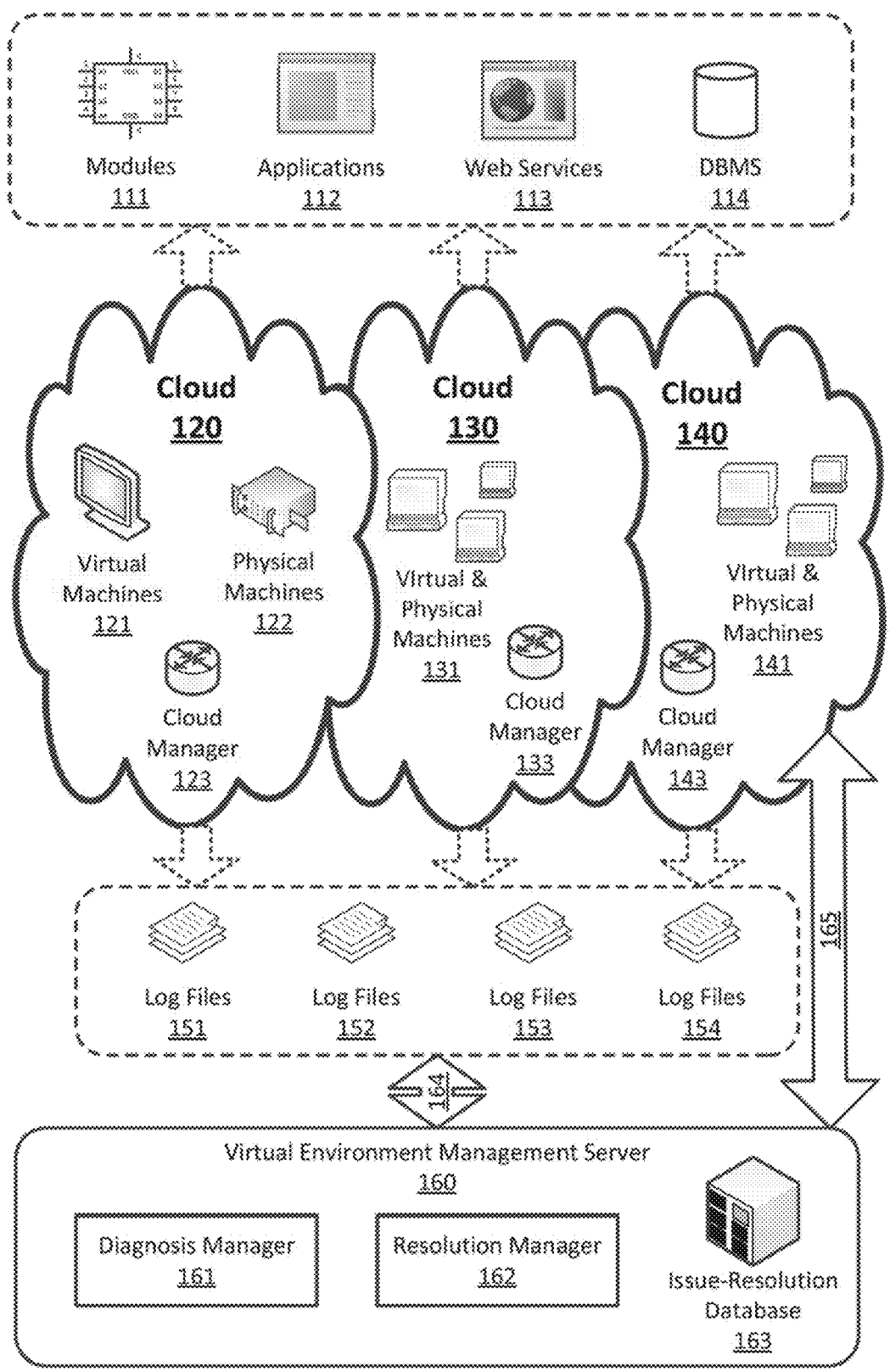
FIG. 1 illustrates a block diagram of a system configured to automatically diagnose and resolve issues in a cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a system configured to automatically diagnose and resolve issues in a cloud environment, according to one or more embodiments of the present disclosure. In FIG. 1, a multi-cloud environment may include one or more clouds 120, 130, and 140. The multi-cloud environment may be managed by a virtual environment management server 160. Specifically, the virtual environment management server 160 may be configured to diagnosis existing and potential operational issues that may be present in the multi-cloud environment, and automatically perform certain actions to resolve the present or potential operational issues.

In some embodiments, a "cloud" in the multi-cloud environment may be a network-based, computing architecture that provides shared pools of cloud resources on demand. A "virtual machine cloud" (or VM cloud) in the multi-cloud environment may be a cloud implemented using virtualized computing resources. The clouds (e.g., cloud 120) may contain, among other components, one or more VMs (e.g., VMs 121) and/or physical machines 122. Further, each cloud may include a cloud manager (e.g., cloud manager 123) configured for implementing the various cloud functionalities such as resource pooling, resource allocating, high-availability, and automation etc. In some embodiments, the clouds 120, 130, and 140 may be constructed using products such as VMWARE® vCloud, and the cloud managers 123, 133, and 121 may be implemented using a VMWARE® vRealize Suite. For example, the cloud 120 may be configured to implement VMWARE VRealize Automation ("VRA"), the cloud 130 may be configured to perform VMWARE VRealize Operations ("VROPS"), and the cloud 140 may be configured with a VMWARE VSPHERE server. Alternatively, the clouds 120, 130, and 140 may be implemented using any commercial cloud products, such as OpenStack® Cloud, and/or AMAZON® S3 Cloud.

As illustrated in cloud 120, the cloud manager 123 may include a VM manager (not shown in FIG. 1) to create one or more VMs 121 based on one or more physical machines 122. The physical machine 122 may be a physical computer system having a "physical hardware platform" (e.g., an x86 architecture platform). The physical machine 122 may include a "hypervisor", which is configured to construct a "virtual hardware platform" for the VMs 121 based on the physical machine 122's physical hardware platform. In other words, a "virtual machine" (VM) 121 may be an abstraction of an actual physical machine 122. The VM manager may coordinate the multiple hypervisors associated with the VMs 121 together to form a distributed (virtual) system (e.g., the cloud 120). Thus, the cloud 120 may be constructed using multiple physical machines 122, and using multiple VMs 121 that are created based on some of the physical machines 122.

In some embodiments, the physical hardware platform of the physical machines 122 may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1). The VM manager may configure the virtual hardware platform of the VM 121 with one or more "virtual hardware components" such as, without limitation, one or more virtual CPUs, virtual memory, virtual storage, virtual NIC, and/or additional virtual components. With helps from the VM manager, the virtual hardware components may emulate the behaviors and the computing capabilities of the corresponding physical hardware components, thereby allowing the VM 121 to function as if it were a physical machine 122.

Similarly, the cloud manager 133 may configure one or more virtual & physical machines 131 in the cloud 130, and the cloud manager 143 may configure one or more virtual & physical machines 141 in the cloud 140. Further, the cloud managers 123, 133, and 143 may implement multiple modules 111 based on the clouds 120, 130, and 140. A "module" may be a hardware or software component either functioning as a substantially independent unit, or implemented in a more-or-less isolated environment. Specifically, the module 111 may be any "hardware component" such as virtual hardware component or physical hardware component as described above. The module 111 may be any "software component" such as, without limitation, operating system (OS), firmware, device driver, software application, and other computer program. The "OS" may be a WINDOWS®, UNIX®, LINUX®, or iOS® operating system. The "firmware" may be a low-level computer program that controls embedded circuitry, peripherals, and other physical hardware components. The "device driver" may be a specialized hardware-dependent computer program to allow transparent interaction with physical hardware components.

In some embodiments, the module 111 may be a software application 112 that can be executed on the VMs 121 or the physical machines 122. The application 112 may include any computer program designed to perform a specific set of coordinated functions, tasks, or activities for the benefit of the end users. Examples of applications 112 may include, without limitations, word processor, spreadsheet, accounting application, database, web browser, media player, graphic editor, game, or photo editor. The applications 112 may also include mission-critical enterprise management and production engineering applications, such as enterprise resource planning (ERP), document management, business workflow management, hardware engineering and software engineering applications.

In some embodiments, the module 111 may be a web-based service 113 that can provide various cloud-based services. The module 111 may also be a part of a multi-layer application, such as the multi-layer application's client-tier, server-tier, web-tier, middleware-tier, or database-tier. Further, the module 111 may also be a specific database management system (DBMS) 114. In addition, the modules 111 may also be any hardware or software components that are designed and maintained by a specific development team.

In some embodiments, during the operations of the clouds 120, 130, and 140, the various modules 111 in these clouds may generate multiple log files 151, 152, 153, and 154. Each "log file" may include operational information automatically generated by one or more modules 111 during operations or passively generated based on external commands. The "operational information" may include messages, warnings, exceptions, errors, statuses, memory dumps, variable values, inputs, outputs, interface invocations, and/or available/used resources associated with the modules 111 and their operations. Specifically, the log files may include operational information generated by the applications 112, the web services 113, and/or the DBMS 114. The log files may also include operational information generated by the virtual hardware platform or physical hardware platform of the cloud 120. For example, the log files 151 may store hardware-based operational information related to network communications, data storages, memory usages, CPU/GPU utilizations, etc.

In some embodiments, operational information from multiple modules 111 may be stored in a single log file 152. For example, multiple applications 112 may share a single log file 152 for storing their network-related operational information. Likewise, operational information from multiple application tiers may be stored in a single log file 153. For example, a single web log file 153 may include web-based data transmissions from/to multiple web services 113 positioned in different application tiers. Further, operational information from a single application module 111 may be stored into multiple log files 154. For example, a single DBMS 114 may generate multiple status log files 154 during operations.

In some embodiments, the log files may contain essential information that is useful for diagnosing and trouble-shooting operational issues. However, such essential information may be stored in unstructured text format or hidden under a large quantity of log data. In some embodiments, the virtual environment management server 160 may be configured to digest the huge amount of log files using data-mining and machine-learning techniques, and extract relevant information from the log files in order to find anomaly and abnormal events contained therein. Thus, the virtual environment management server 160 may be configured to monitor business-critical applications, and smartly resolve and predict core component operational issues of any modules 111 within a stipulated time without impacting the production environment.

In some embodiments, the virtual environment management server 160 may include a diagnosis manager 161 and a resolution manager 162. The diagnosis manager 161 may be configured to determine any operational issues of the modules 111. Specifically, the diagnosis manager 161 may retrieve/collect (164) multiple log files 151, 152, 153, and 154 from multiple modules 111 in the clouds 120, 130, and 140. For example, the diagnosis manager 161 may access the VMs 121 to access/copy log files 151 stored in its virtual storage. The diagnosis manager 161 may invoke a specific web service 113 provided by the cloud 130 to retrieve its log files 152. The diagnosis manager 161 may further access an issue-tracking application 112 (e.g., Bugzilla) to collect bundles of log data, and segregate these log data module-wise into multiple log files 153.

In some embodiments, based on the collected log files 151, 152, 153, and 154, the diagnosis manager 161 may pre-process the operational information stored in these log files 151, 152, 153, and 154, and extract unique tokens from the pre-processed operational information. Afterward, the diagnosis manager 161 may perform data conversion to convert the unique tokens into token-weightage scores, and separate these unique tokens into multiple clusters based on these token-weightage scores. The diagnosis manager 161 may then identify the log files that are associated with the clusters and transmit the clusters with their associated log files to the resolution manager 162 for further processing.

In some embodiments, the resolution manager 162 may evaluate each of the clusters provided by the diagnosis manager 161, and extract diagnosis information (including representative keywords) from the clusters for operational issue identifications. Specifically, the resolution manager 162 may utilize an issue-resolution database 163 to identify which of the modules 111 may have an operational issue, and whether there is a resolution for solving such an operational issue. The issue-resolution database 163 may contain known or pre-defined patterns for operational issues (e.g., trace information, warning, exceptions, and/or errors) related to the modules 111, and contain resolutions (e.g., predefined actions such as fixes, patches, upgrades, tools, and/or auto-recovery scripts) that can be applied to the modules 111 in order to fix/resolve such operational issues. The resolution manager 162 may map the diagnosis information extracted from a specific cluster and its associated log files against pre-defined patterns in the issue-resolution database 163, If a specific operational issue is determined/ identified for a specific module 111, the resolution manager 162 may then extract a resolution from the issue-resolution database 163, and apply (165) such resolution to the clouds 120, 130, and 140. For example, the resolution manager 162 may perform (165) a predefined action on the module 111, in order to fix/resolve the operation issues identified on the module 111.

In some embodiments, the diagnosis manager 161 may periodically and automatically collect and process log files 151, 152, 153, and 154 in real-time, and the resolution manager 162 may automatically resolve any operational issues diagnosed based on the diagnosis information provided by the diagnosis manager 161. The resolution manager 162 may also predict certain operational issues based on the diagnosis information. For example, if the diagnosis information is related to storage shortage, the resolution manager 162 may predict that the corresponding module 111 is run out of storage soon, and invoke auto-recovery scripts to allocate additional storages in the clouds 120, 130, and 140.

Thus, the virtual environment management server 160 may utilize the above approach to analyze module/component wise logs that is essential for developer to troubleshoot actual/potential issues. Even though log files may contain tremendous amount of minute information, by using datamining methods, the virtual environment management server 160 may extract meaningful clusters of relevant information from the large amount of information, in order to quickly and automatically find anomaly and abnormal events. Further, the virtual environment management server 160 may utilize parallelism and in-memory processing to handle exponential growth of real-time log data and detecting frauds in live streams for alerts at faster pace.

Figure 2:
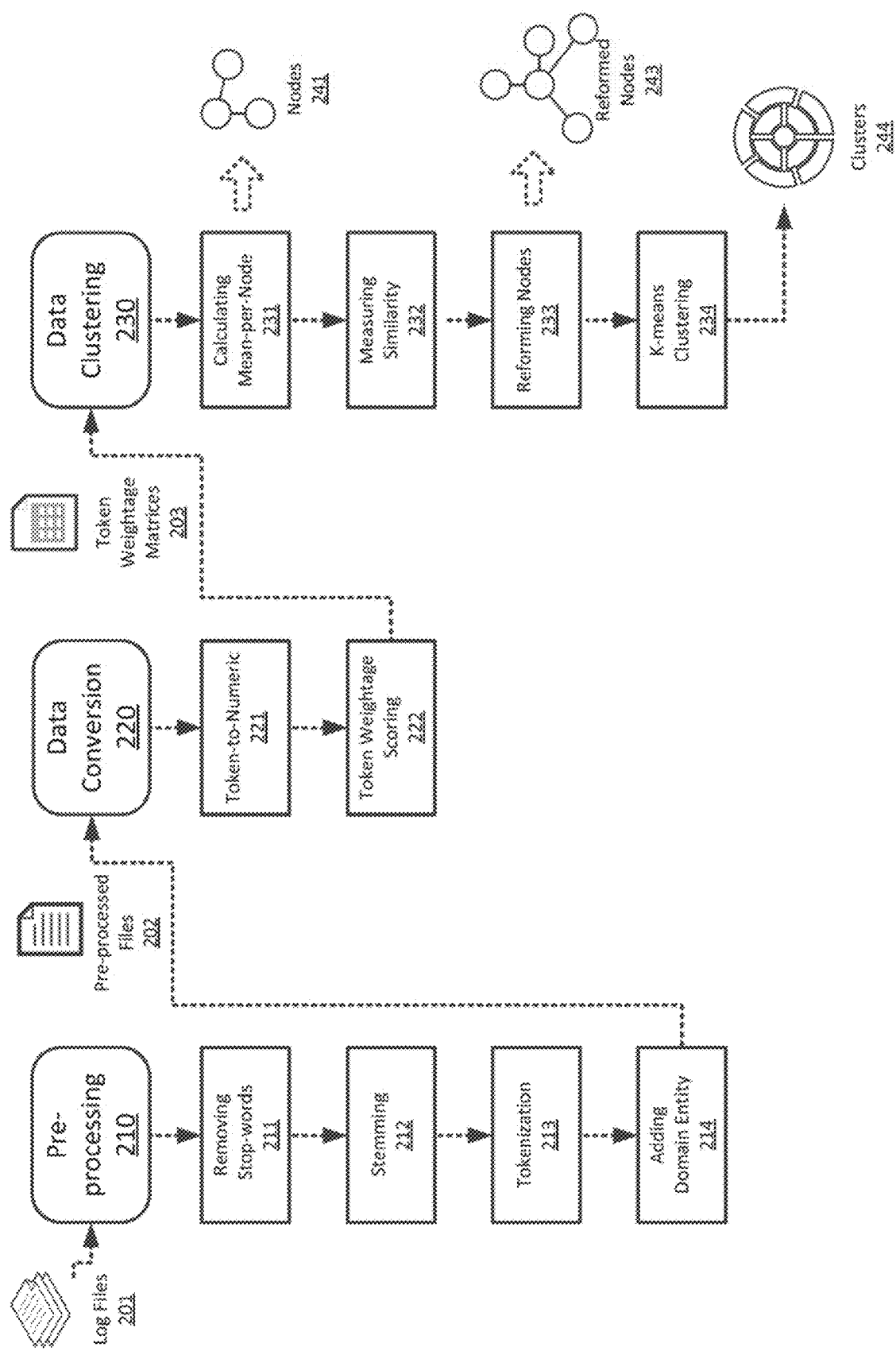
FIG. 2 illustrates a diagnosis process for generating clusters based on multiple log files, according to one or more embodiments of the present disclosure.

FIG. 2 illustrates a diagnosis process for generating clusters based on multiple log files, in accordance with one or more embodiments of the present disclosure. In FIG. 2, a diagnosis manager (similar to the diagnosis manager 161 of FIG. 1) may be configured to process multiple log files 201 (similar to the log files 151, 152, 153, and 154 of FIG. 1) collected from a multi-cloud environment, in order to generate a set of clusters 244 via a pre-processing operation 210, a data conversion operation 220, and a data clustering operation 230. Afterward, the diagnosis manager may transmit the set of clusters 244 to a resolution manager (similar to the resolution manager 162 of FIG. 1) for issue identification/resolution.

In some embodiments, the diagnosis manager may first group log files 201 into multiple bundles based on the related modules that generated these log files 201. Specifically, the diagnosis manager may group log files 201 that are generated from a common module (e.g., a common cloud, application, tier, web service, or DBMS) into a single bundle, and process this bundle of log files 201 together to find application-wise or tier-wise anomalies. For example, the diagnosis manager may divide the log files 201 into a bundle of web log files, a bundle of application server log files, and a bundle of database log files, and process these bundles of log files one-by-one sequentially or in-parallel.

In some embodiments, the diagnosis manager may perform the pre-processing operation 210 to remove unnecessary, meaningless, and/or redundant information in the log files 201, and generate a set of pre-processed files 202 that contain useful and unique information. In other words, the diagnosis manager may filter the operational information in the log files, in order to decrease the size of the log data to be processed and increase the efficiency of the subsequent processing on the pre-processed files 202. Specifically, the diagnosis manager may perform the following pre-processing operations: including without limitation, removing stop-words 211, stemming 212, tokenization 213, and adding domain entity 214.

In some embodiments, the diagnosis manager may perform a removing stop-words operation 211 to filter out/eliminate stop-words from the log files 201. "Stop-words" may be words (e.g., "a", "the", "and") or punctuations in the English language that provide little or no contextual meanings. Afterward, the diagnosis manager may perform stemming 212 to reduce the variations on the words in the log files 201. "Stemming" may refer to an operation to reduce inflected (or derived) words to their word stems, or root forms. For example, stemming 212 may reduce/transform words such as "processing", "processed", and "processor" to their root word "process", or reduce/transform words such as "document", "documents, "docs", and "doc" to the word stem "document".

In some embodiments, the diagnosis manager may perform a tokenization operation 213 to extract multiple tokens from the log files 201. A "token" may refer to a minimum amount of data (e.g., sequence of characters or words) that can convey a specific and useful meaning. For example, a token may be a unique value or identifier such as "error", "exception", or "calc_DT_worker". A token can also be a status message such as "Data not found". In some embodiments, the tokenization operation 213 may be configured to parse/extract each sentence or each word in the log files 201 into a corresponding token. The tokenization operation 213 may also combine multiple words into a single token, or divide/separate a seemly single word ("worker_thread_1_tid912345") into multiple tokens (e.g., two tokens: "worker_thread_1" and "tid912345").

In some embodiments, the diagnosis manager may perform an adding domain entity operation 214 to tag domain entities (e.g., additional identifying, categorizing, and/or tracking information) onto each of the tokens extracted from the log files 201. For example, the diagnosis manager may associate categorizing information (e.g., "error", "warning", and "exception") with each token, or add identifying information such as cloud name, network domain name, module name, thread name, process id, and the log files that contain such token into the pre-processed files 202. Further, the diagnosis manager may associate tracking information such as timestamps to the tokens. Afterward, the diagnosis manager may store the generated tokens to the corresponding pre-processed files 202 that are associated with the log files 201, and transmit the pre-processed files 202 to data conversion 220. Further, the diagnosis manager may simultaneously and/or concurrently pre-process log files 201 that were separated into tier-wise bundles in parallel. The diagnosis manager may also execute the pre-processing operation 210 after detecting or being notified that new log files 201 are created or new events are stored into existing log files 201.

Figure 3:
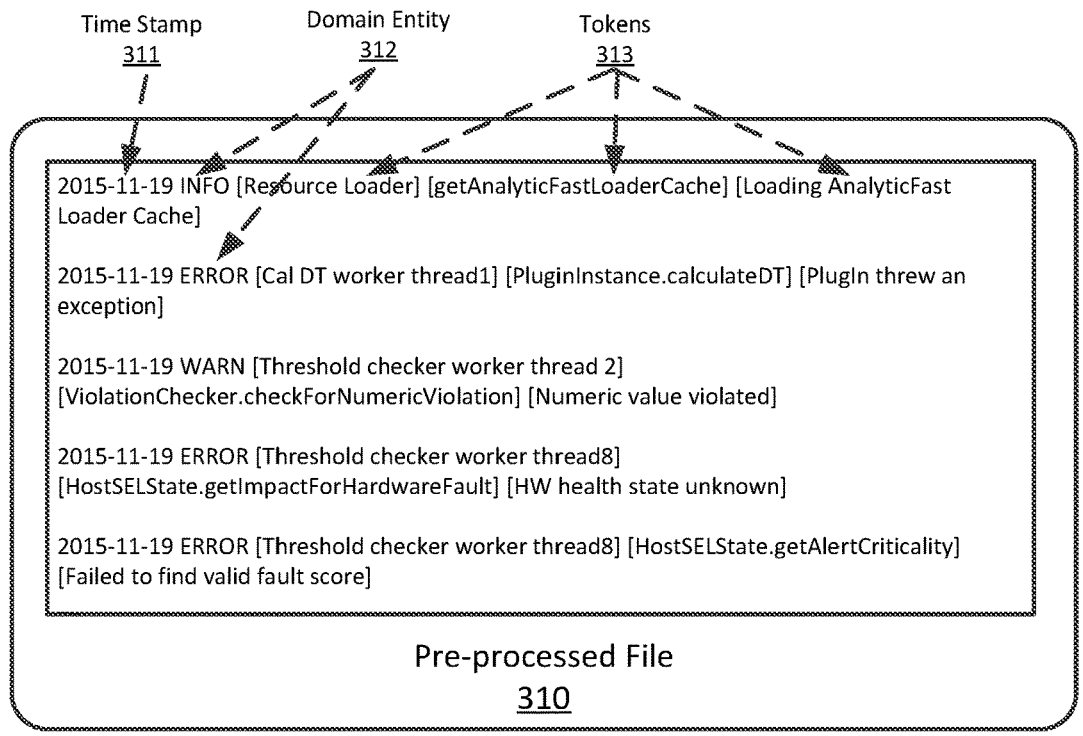
FIG. 3 shows a sample pre-processed file and a sample token-weightage matrix generated based on a log file, according to one or more embodiments of the present disclosure.
Figure 3:
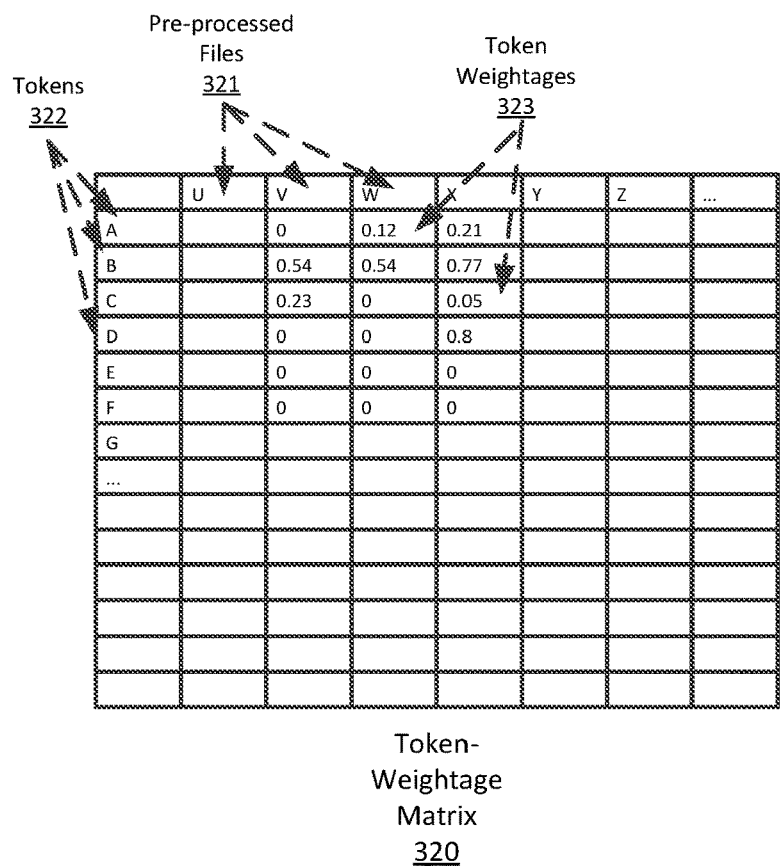

FIG. 3 shows a sample pre-processed file generated based on a log file, as illustrated by one or more embodiments of the present disclosure. In FIG. 3, the pre-processed file 310 may include multiple tokens 313, which are enclosed by brackets "[ ]". Further, the pre-processed file 310 may include domain entities 312 (e.g., "INFO" or "ERROR")

corresponding to the tokens 313. The pre-processed file 310 may also include timestamps 311 associated with the tokens 313.

Referring back to FIG. 2, in some embodiments, the diagnosis manager may perform the data conversion 220 to convert the tokens in the pre-processed files 202 into weighed scores, and generate one or more token-weightage matrices 203 based on the weighted scores. Specifically, the diagnosis manager may perform the following data conversion operations: including without limitation, a token-to-numeric operation 221 and a token-weightage-scoring operation 222.

In some embodiments, the diagnosis manager may perform the token-to-numeric operation 221 to generate a corresponding token-frequency score for each token in the pre-processed files 202. The "token-frequency" may refer to a numeric value/score indicating the number of times (or frequency) a token occurring in a pre-processed file 202. In other words, the weight of a token that occurs in a pre-processed file 202 is proportional to its token-frequency score. In some embodiments, the token-to-numeric operation 221 may also remove any redundant tokens from each of the pre-processed files 202, and store the token-frequency along with each token in the token-weightage matrices 203 as described below. In other words, after the token-to-numeric operation 221, the token-weightage matrices 203 may contain a set of unique tokens and the token-frequency scores of these unique tokens. Further, a unique token may be unique in a specific pre-processed file 202, but may or may not be unique across all the pre-processed files 202.

In some embodiments, the diagnosis manager may perform the token-weightage-scoring operation 222 to generate a corresponding inverse-document-frequency score for each unique token in the pre-processed files 202. The "inverse-document-frequency" may refer to a numeric value/score indicating the number of times a token occurs in all of the pre-processed files 202. The inverse-document frequency may diminish the weight of token that occurs very frequently in the pre-processed files 202, and increasing the weight of the token that occurs rarely. In other words, the more frequent a token is occurring in the pre-processed files 202, the lower the inverse-document-frequency for this token may be.

In some embodiments, the diagnosis manager may generate a corresponding token-weightage for each unique token in the pre-processed files 202 by multiplying the unique token's token-frequency and inverse-token-frequency scores. The "token-weightage" may be used to indicate the importance of a specific token in the pre-processed files 202. The diagnosis manager may then generate one or more token-weightage matrices 203 based on the unique tokens and their corresponding token-weightage scores in the pre-processed files 202.

In some embodiments, the diagnosis manager may select a subset of unique tokens from the pre-processed files 202 having their respective token-weightage scores that are above a predetermined threshold, or select the subset of unique tokens having the top fixed number (e.g., top 10) of toke-weightage scores in the pre-processed files 202. Afterward, the diagnosis manager may generate the token-weightage matrices 202 based on this selected subset of unique tokens. Alternatively, the diagnosis manager may generate the token-weightage matrices 202 based on all the unique tokens in the pre-processed files 202. Further, the diagnosis manager may generate a corresponding token-weightage matrix 202 for each bundle of pre-processed files 202.

In some embodiments, the diagnosis manager may generate a token-weightage matrix 203 that associates the selected unique tokens, their corresponding token-weightage scores, and the pre-processed files 202 (or log files 201) that contain these selected unique tokens. Specifically, the token-weightage matrices 203 may shows whether each unique token is present in a particular pre-processed file 202, and if present, this unique token's corresponding token-weightage score.

FIG. 3 shows a token-weightage matrix generated based on a pre-processed file, as illustrated by one or more embodiments of the present disclosure. In FIG. 3, a token-weightage matrix 320 may include a set of tokens 322, a set of pre-processed files 321, and the corresponding token-weightages 323 for each of the tokens 322 with respect to the pre-processed files 321. In other words, the token-weightage matrix 320 may be used to reflect the corresponding token-weightage of a corresponding token 322 occurring on a specific pre-processed file 321. In FIG. 3's example, the token B may have a corresponding token-weightage of "0.54" in the pre-processed file "W".

Referring back to FIG. 2, in some embodiments, the diagnosis manager may perform the data-clustering operation 230 on the toke-weightage matrices 203 and generate one or more clusters 244. Specifically, the diagnosis manager may perform the following data-clustering operations: including without limitation, a calculating mean-per-node 231, measuring similarity 232, reforming nodes 233, and K-means clustering 234.

In some embodiments, the diagnosis manager may generate a set of nodes 241 based on the unique tokens in the token-weightage matrices 203. Specifically, the diagnosis manager may divide the unique tokens in the token-weightage matrices 203 into multiple nodes, using a particular categorization method such as module-based. In other words, a "node", which may also be referred to as a "token group", or "token set", may be used for grouping a set of similar or related unique tokens. In a module-based categorization, each node 241 may contain a subset of unique tokens associated with a corresponding module (e.g., the module 111 of FIG. 1), and the unique tokens in a particular node 241 may all come from the log files 201 that were generated by this corresponding module. Alternatively, the diagnosis manager may generate a set of nodes using a product-based or tier-based categorization method. In this case, the unique tokens originated from the database-tier may be placed in a first node, and the unique tokens generated by the application-server tier may be stored in a second node.

In some embodiments, for a specific set of unique tokens that are categorized into a particular node, the diagnosis manager may associate the pre-processed files 202 that contains one or more of these specific set of unique tokens with this particular node 241. Since a unique token is only unique within a single pre-processed file 202, and multiple copies of the same unique token may be present in multiple pre-processed files 202, these multiple copies of the unique token may be categorized into a single node 241 or different nodes 241, as these multiple pre-processed files 202 that contain the unique token may be generated by a single module or different modules. Thus, regardless whether a unique token may be present in a single node 241 or different nodes 241, the diagnosis manager may associate the corresponding pre-processed files 202 that contain the unique token with each of the nodes 241 that include the unique token.

In some embodiments, the diagnosis manager may performing a calculating mean-per-node operation 231 for each node based on the formula [1] shown below:

$$\text{Mean per Node} = \frac{\Sigma \text{ Frequency of unique tokens in the Preprocessed Files}}{\text{Number of Preprocessed Files per Node}} \quad \text{Formula [1]}$$

Thus, the diagnosis manager may calculating the "mean-per-node" value for each node by accumulating the frequency scores (or the token-weightages) of one or more of the unique tokens in the pre-processed files associated with a particular node, and divide such accumulated value with the number of pre-processed files associated with this particular node. The resulting mean-per-node value may be used to indicate a weight of a particular unique token or all the unique tokens in a particular node.

In some embodiments, the diagnosis manager may perform a measuring similarity operation 232 for each node. Specifically, the diagnosis manager may compare the similarity-distance for each unique token in a node with the mean-per-node of all the other nodes. The "similarity-distance" may be calculated based on the formula [2] as shown below:

$$\text{Cosine Distance} = \frac{\Sigma W_q * W_i}{\sqrt{\Sigma W_q^2} * \sqrt{\Sigma W_i^2}} \quad \text{Formula [1]}$$

Where Wq may be the token-weightage of a specific unique token, the Wi may be the mean-per-node of the node 241. The above "cosine distance" may be used as a similarity-distance to evaluate the similarity of the unique token with respect to the content of the particular node. For example, if there are 5 nodes (e.g., nodes A, B, C, D, and E), the diagnosis manager may select a node A, which may be associated with 3 unique tokens, pick one of the 3 unique tokens (token x) associated with node A, and calculate the similarity-distances between this token x against the other 4 nodes B, C, D, and E. Afterward, the diagnosis manager may transmit the cosine distances to the reforming nodes operations 233.

In some embodiments, the diagnosis manager may move the unique tokens associated with one node to another node 241 by determining the greatest similarity-distance. When an unique token from a first node has a greater similarity-distance to a second node, it may indicate that such unique token may be more related to the unique tokens in the second node than to those in the first node. Based on the formula [2] above, the more the cosine distance is closer to value 1, the more similar between the unique token and the tokens in the second node. The diagnosis manager may identify any particular node from the rest of nodes that has a similarity-distance being the greatest (e.g., being closest to value 1), and move the unique token to this particular node. For example, if the cosine distance between token x and Node E is closest to 1 (e.g. 0.9), then the token x may be moved from its original node to Node E.

In some embodiments, the diagnosis manager may repeat the above operations of calculating mean-per-node 231, measuring similarity 232, and reforming nodes 233 after each moving of the unique tokens from one node to another node, until there is no further movement of unique tokens among the nodes. Further, when a unique token is moved from the first node to the second node, the pre-processed files 202 that contain the moved unique token may also have its association with the first node changed to the second node. Afterward, the diagnosis manager may deem these nodes with no further movement reformed nodes 243, and proceed to the K-means clustering 234 for further processing.

In some embodiments, the diagnosis manager may perform K-means clustering 234 to divide all the reformed nodes 243 into multiple clusters 244. A "cluster" may refer to a group of nodes that have sufficient degrees of similarity and/or relationships among each other. Specifically, the diagnosis manager may utilize a K-means algorithm to find coherent groups (e.g., clusters) in the reformed nodes 243.

Figure 4:
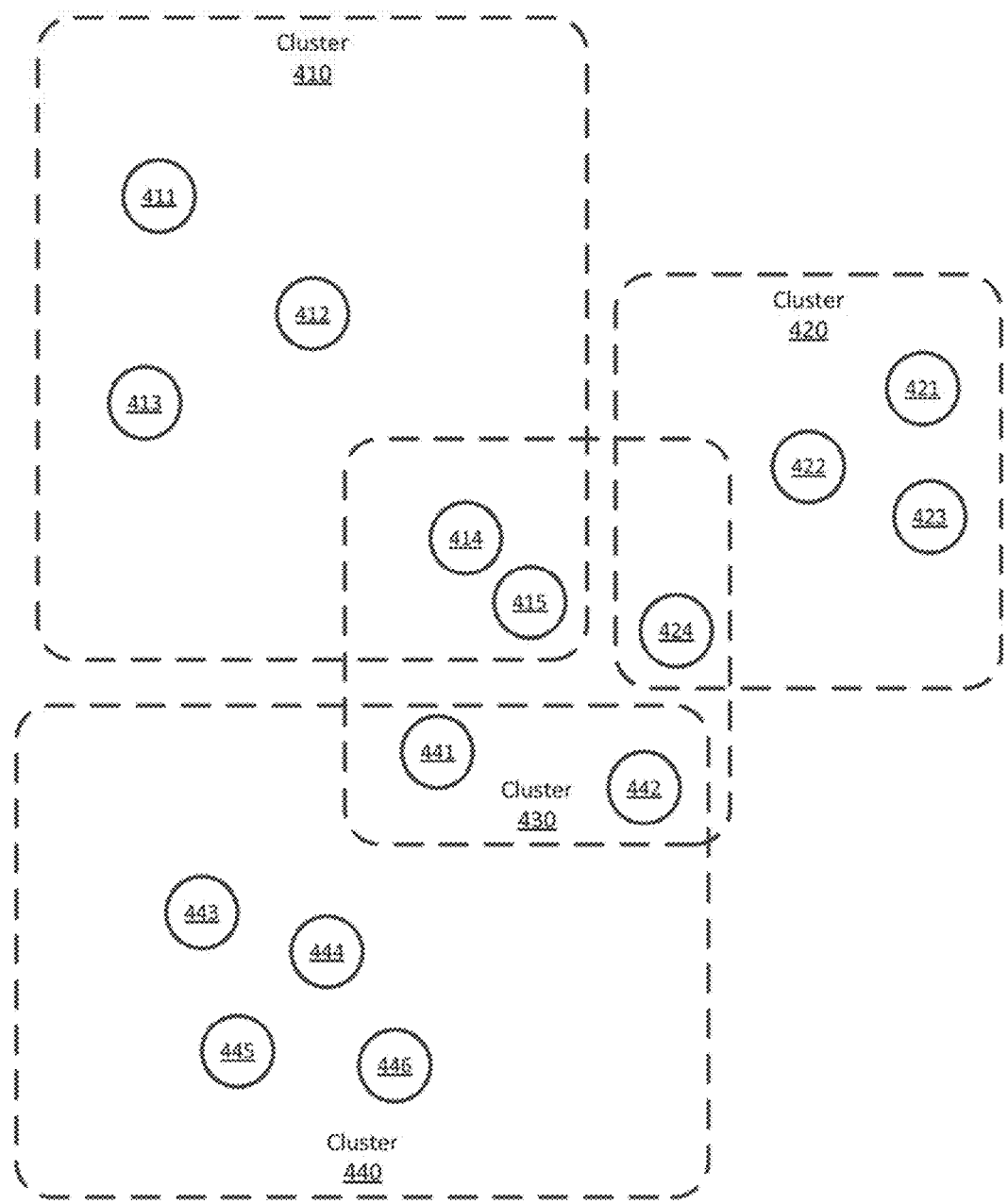
FIG. 4 shows a diagram showing multiple nodes being separated into multiple clusters, according to one or more embodiments of the present disclosure.

FIG. 4 illustrates a diagram showing multiple nodes being separated into multiple clusters, in accordance to one or more embodiments of the present disclosure. In FIG. 4, the nodes may be represented by circles (e.g., circle 411), and the clusters may be represented by dotted boxes that enclosing the circles. In other words, each cluster may contain one or more nodes, and each node may be categorized/included in one cluster at a time.

In some embodiments, the diagnosis manager may first divide the nodes into a predetermined initial number of clusters. For example, the diagnosis manager may first divide the nodes in the FIG. 4 into an initial number (e.g., a number from 3 to 5) of clusters 410, 420, and 440, each of which having a corresponding cluster centroid (e.g., node 412 for cluster 410, node 422 for cluster 420, and node 444 for cluster 440). A "cluster centroid" for a specific cluster may be a geometric center or the arithmetic means of all the nodes in this specific cluster. In other words, the nodes in a cluster may be closer (e.g., has more similarity) to the cluster centroid than to other nodes in any other clusters. Thus, the nodes belonging to a common cluster may be used for better identifying an operational issue or exception.

In some embodiments, the diagnosis manager may select from the token-weightage matrices a subset of unique tokens having token-weightages that are above a predetermined threshold, and select those nodes that contain the subset of unique tokens as the initial cluster centroids for the initial number of clusters 410, 420, and 430. Alternatively, the diagnosis manager may select those nodes having high mean-per-node values as the initial cluster centroids. Afterward, the diagnosis manager may compare the rest of nodes with these cluster centroids, and categorize each node into one of the clusters based on the corresponding similarity-distance between the node and the cluster centroids. For example, the diagnosis manager may calculate the similarity-distances between node 414 and the cluster centroids 412, 422 and 444, and determine that the smallest similarity-distance is between the node 414 and the cluster centroid 412. In this case, the diagnosis manager may categorize the node 414 into the cluster 410. After all the nodes are categorized into their respective clusters 410, 420, and 440, the diagnosis manager may update the cluster centroids for all the clusters based on an average (or mean) value of all the mean-per-node values of the nodes in the clusters. Thus, the cluster centroids for the clusters may be changing during the K-means clustering operation 234.

In some embodiments, the diagnosis manager may increment the number of clusters and iterate through the above categorizing process multiple times. Specifically, to run another iteration of K-means clustering operation 234, the diagnosis manager may identify another cluster centroid (e.g., node 415), and re-categorize all the nodes based on the cluster centroids 412, 422, 444, and 415. After processing, the diagnosis manager may generate a new cluster 430, which contains nodes 414 and 415 originally in the cluster 410, node 424 originally in the cluster 420, and nodes 441 and 442 originally in the cluster 440. After completed this iteration of K-means clustering, the diagnosis manager may update the cluster centroids for all the clusters, and may perform additional iterations of K-means clustering 234 until the clustering outcome converges to a local optimum. In other words, the diagnosis manager may stop additional iterations of K-means clustering when there is no substantial amount of node movements among the clusters.

In some embodiments, each cluster 244 may be represented by one or more "representative keywords" determined by maximum number of unique tokens in each cluster 244. In other words, the representative keywords of a cluster may include the unique tokens that can best represent/illustrate the contents of the nodes contained in the cluster. Afterward, the diagnosis manager may transmit the clusters 244 to the resolution manager, which may subsequently uses the representative keywords in the clusters 244 for identifying operational issues such as exceptions/errors/bugs, and for auto-resolving the identified operational issues in the cloud environment.

In some embodiments, the diagnosis manager may adjust the nodes in the clusters by comparing each unique token of the node with representative keywords of the clusters. The diagnosis manager may move a node from a first cluster to a second cluster if the unique token associated with the node is more similar to the representative keywords of the second cluster than to those of the first cluster. Such an approach may further improve the purity of each cluster.

Figure 5:
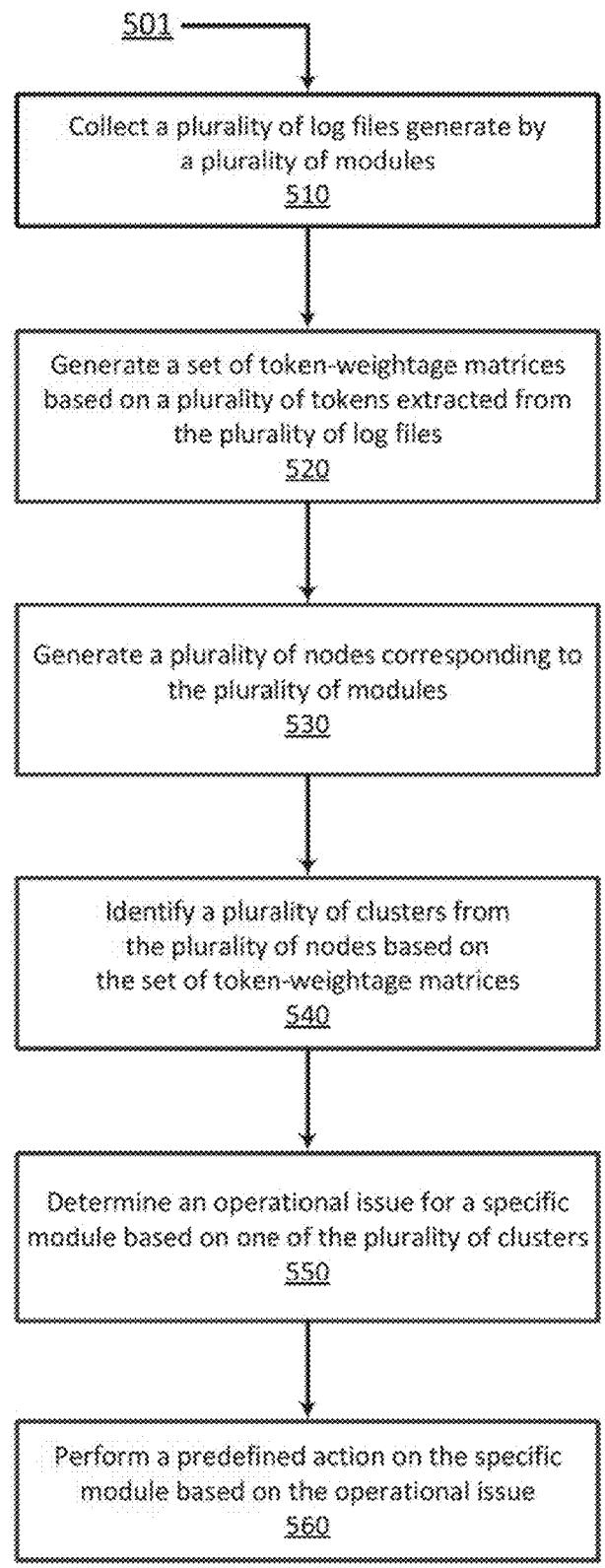
FIG. 5 shows a flow diagram illustrating a process automatically diagnose and resolve operational issues in a cloud environment, according to one or more embodiments of the present disclosure.

FIG. 5 shows a flow diagram illustrating a process automatically diagnose and resolve operational issues in a cloud environment, according to one or more embodiments of the present disclosure. The processes 501 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a diagnosis manager in a virtual environment management server may be configured to collect a plurality of log files generated by a plurality of modules operating in the cloud environment. Each of the plurality of log files may contain operational information related to one or more of the plurality of modules. The diagnosis manager may generate a plurality of pre-processed files based on the plurality of log files. Specifically, the diagnosis manager may identify a plurality of words in each of the plurality of log files, extract one or more tokens from the plurality of words after removing stop-words from and performing stemming on the plurality of words, and include the one or more tokens in the plurality of tokens.

At block 520, the diagnosis manager may generate a set of weightage matrices based on a plurality of tokens extracted from the plurality of log files or the plurality of pre-processed files. Specifically, the diagnosis manager may generate a corresponding token-frequency for each of the plurality of tokens, generate a corresponding inverse-document-frequency for each of the plurality of unique tokens, and generate a corresponding token-weightage for each of the plurality of tokens based on the corresponding token-frequency and the corresponding inverse-document-frequency. Afterward, the diagnosis manager may select a subset of tokens from the plurality of tokens based on their corresponding token-weightages, and construct the set of weightage matrices based on the subset of tokens, the corresponding frequency scores associated with the subset of tokens, and the plurality of log files that contain the subset of tokens. Alternatively, the diagnosis manager may construct the set of weightage matrices based on the plurality of tokens extracted from the plurality of log files, the corresponding frequency scores associated with the plurality of tokens, and the plurality of log files that contain the plurality of tokens.

At block 530, the diagnosis manager may generate a plurality of nodes corresponding to the plurality of modules. Each of the plurality of nodes is associated with one or more tokens selected from the plurality of tokens. Specifically, the diagnosis manager may generate the plurality of nodes based on the tokens selected from the plurality of tokens and having a corresponding token-weightage above a predetermined threshold in the set of weightage matrices. Alternatively, the diagnosis manager may generate a specific node for the plurality of nodes based on the one or more tokens selected from the plurality of tokens and corresponding to one of the plurality of modules. In some embodiments, when a first token associated with a first node selected from the plurality of nodes has a similarity-distance that is closer to a second node selected from the plurality of nodes, the diagnosis manager may associate the first token from the first node to the second node.

At block 540, the diagnosis manager may identify a plurality of clusters from the plurality of nodes based on the set of weightage matrices. Each of the plurality of clusters includes a subset of nodes selected from the plurality of nodes and is associated with a representative keyword. Alternatively, each of the plurality of clusters includes a subset of tokens selected from the plurality of tokens. Specifically, the diagnosis manager may select an initial number of nodes from the plurality of nodes as a first set of cluster centroids associated with the plurality of clusters. For a first node selected from the plurality of nodes that are not in the first set of cluster centroids, the diagnosis manager may categorize the first node into one of the plurality of clusters by evaluating corresponding similarity-distances between the first node and the first set of cluster centroids. In other words, the diagnosis manager may associate the plurality of nodes with the plurality of clusters based on the set of weightage matrices, and associate a first node from a first cluster to a second cluster selected from the plurality of clusters when the first node has a similarity-distance that is closer to the second cluster than to the first cluster.

In some embodiments, the diagnosis manager may perform a K-means clustering on the plurality of nodes to generate the plurality of clusters. Specifically, after the categorizing of the first node into one of the plurality of clusters, the diagnosis manager may calculate a second set of cluster centroids associated with the plurality of clusters. For a second node selected from the plurality of nodes that are not in the second set of cluster centroids, the diagnosis manager may categorize the second node into one of the plurality of clusters by evaluating corresponding similarity-distances between the second node and the second set of cluster centroids.

At block 550, a resolution manager in the virtual environment management server and coupled with the diagnosis manager may determine an operational issue for a specific module selected from the plurality of modules and associated with a specific cluster selected from the plurality of clusters, based on the corresponding representative keyword associated with the specific cluster. Specifically, the resolution manager may utilize an issue-resolution database coupled with the resolution manager, which includes a set of predefined patterns associated with a set of operational issues. The resolution manager is further configured to identify a specific predefined pattern selected from the set of predefined patterns based on the subset of tokens or the representative keywords, and select the operation issue that is associated with the specific predefined pattern from the set of operational issues. If the resolution manager cannot determine the operation issue based on the predefined patterns in the issue-resolution database, the resolution manager may generate an alert and transmit such alert, along with the subset of tokens or the representative keywords, to the respective owner of the module that generated the representative keyword for further resolution.

At block 560, the resolution manager may perform a predefined action on the specific module based on the operational issue. Specifically, the issue-resolution database further includes a set of predefined actions associated with the set of operational issues, and the resolution manager is further configured to identify the predefined action from the set of predefined actions based on the operation issue that is associated with the predefined action.

Thus, systems and methods for automatically diagnosing and resolving operational issues in a cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for automatically diagnosing and resolving operational issues in a cloud environment, the method comprising:
   collecting, by a diagnosis manager, a plurality of log files generated by a plurality of modules operating in the cloud environment, wherein each of the plurality of log files contains operational information related to one or more of the plurality of modules;
   generating, by the diagnosis manager, a set of weightage matrices based on a plurality of tokens extracted from the plurality of log files;
   generating, by the diagnosis manager, a plurality of nodes corresponding to the plurality of modules, wherein each of the plurality of nodes is associated with one or more tokens selected from the plurality of tokens;
   identifying, by the diagnosis manager, a plurality of clusters from the plurality of nodes based on the set of weightage matrices, wherein each of the plurality of clusters includes a subset of nodes selected from the plurality of nodes and is associated with a representative keyword including one or more tokens that represent contents of the subset of nodes; and
   determining, by a resolution manager coupled with the diagnosis manager, an operational issue for a specific module selected from the plurality of modules and associated with a specific cluster selected from the plurality of clusters, based on the corresponding representative keyword associated with the specific cluster.

2. The method as recited in the claim 1, wherein the method further comprises:
   performing, by the resolution manager, a predefined action on the specific module based on the operational issue.

3. The method as recited in the claim 1, wherein the generating of the set of weightage matrices comprises:
   for a log file selected from the plurality of log files, identifying a plurality of words in the log file;
   extracting one or more tokens from the plurality of words after removing stop-words from and performing stemming on the plurality of words; and
   including the one or more tokens in the plurality of tokens.

4. The method as recited in the claim 1, wherein the generating of the set of weightage matrices comprises:
   generating a corresponding token-frequency for each of the plurality of tokens;
   generating a corresponding inverse-document-frequency for each of the plurality of unique tokens; and
   generating a corresponding token-weightage for each of the plurality of tokens based on the corresponding token-frequency and the corresponding inverse-document-frequency.

5. The method as recited in the claim 4, wherein the generating of the set of weightage matrices further comprises:
   selecting a subset of tokens from the plurality of tokens based on their corresponding token-weightages;
   constructing the set of weightage matrices based on the subset of tokens, the corresponding frequency scores associated with the subset of tokens, and the plurality of log files that contain the subset of tokens.

6. The method as recited in the claim 1, wherein the generating of the plurality of nodes comprises:
   generating a specific node for the plurality of nodes based on the one or more tokens selected from the plurality of tokens and corresponding to one of the plurality of modules.

7. The method as recited in the claim 1, wherein the generating of the plurality of nodes comprises:
   when a first token associated with a first node selected from the plurality of nodes has a similarity-distance that is closer to a second node selected from the plurality of nodes, associating the first token from the first node to the second node.

8. The method as recited in the claim 1, wherein the identifying of the plurality of clusters from the plurality of nodes comprises:
   selecting an initial number of nodes from the plurality of nodes as a first set of cluster centroids associated with the plurality of clusters;
   for a first node selected from the plurality of nodes that are not in the first set of cluster centroids, categorizing the first node into one of the plurality of clusters by evaluating corresponding similarity-distances between the first node and the first set of cluster centroids.

9. The method as recited in the claim 8, further comprising:
   after the categorizing of the first node into one of the plurality of clusters, calculating a second set of cluster centroids associated with the plurality of clusters; and
   for a second node selected from the plurality of nodes that are not in the second set of cluster centroids, categorizing the second node into one of the plurality of clusters by evaluating corresponding similarity-distances between the second node and the second set of cluster centroids.

10. A non-transitory computer-readable storage medium, containing a set of instructions which, when executed by a processor, cause the processor to perform a method for automatically diagnosing and resolving operational issues in a cloud environment, the method comprising:
   generating, by a diagnosis manager, a plurality of pre-processed files based on a plurality of log files, wherein each of the plurality of log files contains operational information related to one or more of the plurality of modules operating in the cloud environment;
   generating, by the diagnosis manager, a set of weightage matrices based on a plurality of tokens extracted from the plurality of pre-processed files;
   identifying, by the diagnosis manager, a plurality of clusters by generating a plurality of nodes corresponding to the plurality of modules based on the set of weightage matrices, and identifying the plurality of clusters from the plurality of nodes based on the set of weightage matrices, wherein each of the plurality of clusters includes a subset of tokens selected from the plurality of tokens;
   determining, by a resolution manager coupled with the diagnosis manager, an operational issue for a specific module selected from the plurality of modules and associated with a specific cluster selected from the plurality of clusters, based on the subset of tokens associated with the specific cluster; and
   performing, by the resolution manager, a predefined action on the specific module based on the operational issue.

11. The non-transitory computer-readable storage medium of the claim 10, wherein the generating of the plurality of pre-processed files based on a plurality of log files comprises:
- identifying a plurality of words from a log file selected from the plurality of log files;
- extracting one or more tokens from the plurality of words after removing stop-words from and performing stemming on the plurality of words; and
- storing the one or more tokens in one of the plurality of pre-processed files associated with the log file.

12. The non-transitory computer-readable storage medium of the claim 10, wherein the generating of the set of weightage matrices based on a plurality of tokens comprises:
- generating a corresponding token-frequency for each of the plurality of tokens;
- generating a corresponding inverse-document-frequency for each of the plurality of unique tokens; and
- generating a corresponding token-weightage for each of the plurality of tokens based on the corresponding token-frequency and the corresponding inverse-document-frequency.

13. The non-transitory computer-readable storage medium of the claim 12, wherein the generating of the set of weightage matrices based on a plurality of tokens further comprises:
- constructing the set of weightage matrices based on the plurality of tokens, the corresponding frequency scores associated with the plurality of tokens, and the plurality of log files that contain the plurality of tokens.

14. The non-transitory computer-readable storage medium of the claim 10, wherein the generating of the plurality of nodes based on the set of weightage matrices comprises:
- generating the plurality of nodes based on the tokens selected from the plurality of tokens and having a corresponding frequency-weightage above a predetermined threshold in the set of weightage matrices; and
- when a first token associated with a first node selected from the plurality of nodes has a similarity-distance that is closer to a second node selected from the plurality of nodes, associating the first token from the first node to the second node.

15. The non-transitory computer-readable storage medium of the claim 10, wherein the identifying of the plurality of clusters from the plurality of nodes based on the set of weightage matrices comprises:
- associating the plurality of nodes with the plurality of clusters based on the set of weightage matrices; and
- associating a first node from a first cluster to a second cluster selected from the plurality of clusters when the first node has a similarity-distance that is closer to the second cluster than to the first cluster.

16. The non-transitory computer-readable storage medium of the claim 10, wherein the identifying of the plurality of clusters from the plurality of nodes based on the set of weightage matrices further comprises:
- performing a K-means clustering on the plurality of nodes to generate the plurality of clusters.

17. A system for automatically diagnosing and resolving operational issues in a cloud environment, the system comprising:
- a management server comprising:
  - a diagnosis manager configured to
    - collect a plurality of log files generated by a plurality of modules operating in the cloud environment, wherein each of the plurality of log files contains operational information related to one or more of the plurality of modules,
    - generate a set of weightage matrices based on a plurality of tokens extracted from the plurality of log files,
    - generate a plurality of nodes based on the set of weightage matrices, wherein each of the plurality of nodes is associated with one or more tokens selected from the plurality of tokens, and
    - identify a plurality of clusters from the plurality of nodes based on the set of weightage matrices; and
  - a resolution manager coupled with the diagnosis manager, wherein the resolution manager is configured to
    - determine an operational issue for a specific module selected from the plurality of modules and associated with a specific cluster selected from the plurality of clusters, based on a subset of tokens associated with the specific cluster, and
    - perform a predefined action on the specific module based on the operational issue.

18. The system of claim 17, wherein the system further comprises:
- an issue-resolution database coupled with the resolution manager, wherein the issue-resolution database includes a set of predefined patterns associated with a set of operational issues, and the resolution manager is further configured to identify a specific predefined pattern selected from the set of predefined patterns based on the subset of tokens, and determine the operation issue that is associated with the specific predefined pattern.

19. The system of claim 18, wherein the issue-resolution database further includes a set of predefined actions associated with the set of operational issues, and the resolution manager is further configured to identify the predefined action from the set of predefined actions based on the operation issue that is associated with the predefined action.

* * * * *